Patented Dec. 24, 1935

2,025,180

UNITED STATES PATENT OFFICE 2,025,180

ADHESIVE

Frank H. Shoals, Baltimore, Md., assignor to Modern Panels, Inc., a corporation of Maryland No Drawing. Application January 11, 1933, Serial No. 651,229

6 Claims. (Cl. 134—17)

This invention is an adhesive for general use, but also possessing characteristics which make it valuable for use in uniting veneer, or other similar ornamental facings to cores of fire-resistant non-metallic silicate materials. Such a veneer structure is described and claimed in a copending application filed by Roger W. Williamson of even date herewith. It is to be understood, however, that the present invention is not limited to this particular use.

One of the objects of the invention is to provide an adhesive which is practically impervious to aqueous moisture. A further object is to provide an adhesive possessing binding or cementing characteristics to a high degree, and containing an ingredient which will act as a barrier to any chemical reaction between the alkalinity of a core construction of non-metallic inorganic silicates and the acid of a wood veneer facing for said core. A further object is to provide an adhesive containing a coagulable ingredient capable of providing a resilient filling for the valleys or depressions which occur in uneven surfaces of the supporting cores for veneer and the like, so that an effective resilient filling bond may be obtained between the uneven surfaces and ornamental veneer-like facings. A further object is to provide an adhesive for effecting a firm and practically inseparable bond between paper labels and metal, wood or other surfaces.

The invention will be hereinafter fully set forth and particularly pointed out in the claims.

In its preferred form, the adhesive of the present invention includes hydrolized starch and a solution of rubber latex among its ingredients. Any well known starch may be employed, such as the starch derivatives of tapioca root, maize or Indian corn, potato, or sago flour. Hydrolysis of the starch may be effected by any of the well known methods, but it is preferred to employ malt diastase for this purpose.

In preparing the mixture the starchy material is mixed with heated water and the temperature of the mass raised until the bursting point of the starch is reached. During the last mentioned period, the malt diastase is added. From this time, the viscosity of the mass must be controlled and this is preferably accomplished by adding to the hydrolized mass a mixture of borax and caustic soda in water. After the desired viscosity is obtained, water is added in sufficient quantity to produce the desired quantity of the final mixture, the amount of water required depending upon the amount of starch, the malt diastase, borax, caustic soda and water which have been previously added.

After the desired viscosity has been obtained and the water has been added the mass is thoroughly mixed. However, in order to keep the rubber particles in the latex in suspension, it is necessary to make the solution strongly alkaline. This may be done by incorporating any alkaline material, such as ammonia, caustic soda or the like, which possesses the characteristic of so acting upon the rubber latex as to keep it in liquid condition and normally prevent coagulation of the rubber, the quantity of the alkali to be added to be determined by the best judgment of the chemist in view of the proportion of the volume of latex employed bears with respect to the other ingredients. Following the addition of the alkaline solution, the mass is allowed to cool to room temperature and the latex then added, the mass being very slowly and gently agitated during the addition of the latex, so as to prevent coagulation of the rubber.

If the adhesive is to be stored over a long period of time, coagulation of the rubber is likely to occur as a result of the natural evaporation of the alkali. To prevent this coagulation, a small additional quantity of alkali is incorporated and a small quantity of orthophenylphenate is added as a preservative, the amounts to be determined by the best judgment of the chemist based upon his skilled observation.

The following proportions and detailed steps of mixing the various ingredients are given for purposes of illustration, and without intent to limit the invention, because the proportions and temperatures may be varied to suit different conditions without departing from the spirit of the invention.

Assuming a mix of

|   | Pounds |
|---|---|
| Tapioca flour of best quality | 840 |
| Water | 960 |
| Malt diastase | 12 |

Put the starch in the water at an approximate temperature of 125° F. and then add the malt diastase, after which the temperature of the mass is raised to the bursting point of the starch, which is at approximately 160° F. A short time (approximately 25 minutes) should elapse between the time the malt diastase is added and the time of reaching the said bursting temperature.

To determine whether or not the glue is properly converted it is necessary to make tests of its viscosity by suitable means, such as by use of a viscosimeter, in order that excess viscosity may be prevented. Such excess viscosity is reduced by the addition of a mixture of borax, caustic soda and hot water. It is preferred to make this solution for the proportions of starch and malt diastase above given in the following proportions:—

|   | Pounds |
|---|---|
| Borax | 125 |
| Caustic soda | 1 |
| Hot water | 125 |

These proportions may be varied, however, without departing from the spirit of the invention.

The viscosity reducing solution is added to the hydrolized starch mass and thoroughly mixed therewith, after which sufficient water is added to yield the desired quantity of liquid glue. In other words, with the proportions of the other ingredients above given, sufficient water should be added to produce approximately 2300 pounds of liquid glue.

It is then necessary to make the solution strongly alkaline in order that the rubber constituents of the latex solution may be held in suspension, in such manner that they will not coagulate or form into lumps. Various alkalis are known in the art to be capable of preventing such coagulation, but it is preferred to add ammonia to the mixture above described in the proportion of 3½% of the volume of glue thus far produced. After adding the ammonia the glue mass is allowed to cool down to room temperature and thereupon the latex solution is added in the proportion of approximately 22½% by weight of a 60% latex solution. During the introduction of the latex solution agitation must be very slow and gentle to prevent coagulation of the rubber.

If the glue is to be stored over a long period of time, it is necessary to add more ammonia and a small quantity of sodium orthophenylphenate as a preservative. The glue is now ready for such uses as may be desired.

The advantages of the invention will be readily understood by those skilled in the art to which it belongs. For instance, a very strong adhesive is provided which is capable of use for any purpose to which an adhesive is normally applicable, the same containing rubber in sufficient quantity to be practically impervious to aqueous moisture. Another advantage is that the rubber content of the glue is normally held in suspension and without coagulation. By reason of this factor it may be freely and evenly distributed throughout the mass and over the surfaces to which it is to be applied, so that as the water and ammonia evaporate from the thin layer spread upon a surface, the rubber congeals upon said surface, the elimination of the water and ammonia from the adhesive being accelerated by the osmotic pressure exerted by the contracting rubber content. Another advantage is that being of an alkaline character, the adhesive will not attack the alkaline ingredients of a fire-resistant core constructed of non-metallic inorganic silicates, such as has been above referred to, and therefore will effect a perfect bond between the surfaces of such core when used to secure ornamental facings thereto. Where used to unite wood veneer facings to such alkaline cores, the adhesive acts as a barrier to any reactions between the alkalinity of the core and the acidity of wood veneer facings for said core, and in addition to this the alkali in the glue will neutralize the acidity of the wood, and effect an exceedingly strong bond therewith. Therefore, a practically permanent bond will be effected between the non-metallic inorganic silicate core and the wood veneer, making the adhesive of especial value in the manufacture of laminated materials such as disclosed in the Roger W. Williamson application above referred to. Another advantage of the adhesive is that owing to the presence of rubber in suspension, the rubber particles are deposited into the valleys or depressions which inherently exist in the uneven surfaces of fire-resistant cores containing asbestos and similar substances, so that the rubber will build up a resilient filling bond, which compensates for all unevenness of the surface of the core to which the wood veneer or other ornamental veneer-like facing is to be secured. Another advantage is that by reason of the presence of the rubber content, the adhesive is rendered acoustically turbid, i. e. it possesses certain sound deadening characteristics which are very valuable, especially when the glue is employed in the manufacture of laminated materials which are intended for use in building walls or wall panels. Another advantage is that by reason of the hydrolysis of the starch, an excellent adhesive is produced, and by the maintaining of the rubber latex in solution, the rubber particles perform a very important function in cementing labels to metal, wood and various other surfaces.

Having thus explained the nature of the invention and described an operative manner of constructing and using the same, although without attempting to set forth all of the forms in which it may be made, or all of the forms of its use, what is claimed is:—

1. The method of producing an adhesive comprising hydrolyzing starch, controlling the viscosity of the starch during the hydrolyzing stage by adding thereto a mixture of borax and soda during the hydrolyzing stage, diluting the viscosity-controlled mass with water, adding to the diluted mass an alkaline latex-coagulating-control agent, allowing the mass to cool to room temperature, adding latex solution thereto, and gently agitating the mass during the addition of the latex.

2. The method of producing a normally liquid adhesive comprising hydrolizing starch and controlling the viscosity thereof by adding thereto, during the hydrolizing stage, a mixture of borax, soda and water, diluting the viscosity-controlled mass with additional water, alkalinizing the diluted mass by adding ammonia thereto, and adding latex to the alkalinized mass.

3. A normally liquid adhesive consisting of a solution of rubber latex, an aqueous solution of hydrolized starch of approximately fixed viscosity, and ammonia.

4. A normally liquid adhesive consisting of a solution of rubber latex, an aqueous solution of a mixture of hydrolized starch, borax and caustic soda, in which the borax and caustic soda are so proportioned as to maintain the starch at an approximately fixed viscosity, and ammonia.

5. A normally liquid adhesive consisting of a diluted aqueous solution of a mixture of hydrolized starch, borax and caustic soda, in which the borax and caustic soda are so relatively proportioned as to maintain the starch at an approximately fixed viscosity, ammonia, and a 60% latex solution.

6. A normally liquid adhesive consisting of a diluted aqueous solution of a mixture of hydrolized starch, borax and caustic soda, in which the borax and caustic soda are so relatively proportioned as to maintain the starch at an approximately fixed viscosity, ammonia in proportion of approximately 3½% by weight of the said solution, and a 60% latex solution in the proportion of 22½% by weight of all of the previously mentioned ingredients.

FRANK H. SHOALS.